United States Patent
Viswanathan

(10) Patent No.: US 10,902,634 B2
(45) Date of Patent: Jan. 26, 2021

(54) METHOD AND APPARATUS FOR PROVIDING FEATURE TRIANGULATION

(71) Applicant: HERE GLOBAL B.V., Eindhoven (NL)

(72) Inventor: Anirudh Viswanathan, Berkeley, CA (US)

(73) Assignee: HERE Global B.V., Eindhoven (NL)

( * ) Notice: Subject to any disclaimer, the term of this patent is extended or adjusted under 35 U.S.C. 154(b) by 100 days.

(21) Appl. No.: 16/209,611

(22) Filed: Dec. 4, 2018

(65) Prior Publication Data
US 2020/0175718 A1 Jun. 4, 2020

(51) Int. Cl.
G06T 15/10 (2011.01)
G06T 7/73 (2017.01)
G06K 9/00 (2006.01)

(52) U.S. Cl.
CPC ............ *G06T 7/74* (2017.01); *G06K 9/00818* (2013.01); *G06K 9/00825* (2013.01); *G06T 2207/30252* (2013.01)

(58) Field of Classification Search
CPC ... G06T 15/205; G06T 17/00; G06T 2200/08; G06T 2207/10016; G06T 2207/10021; G06T 2207/10024; G06T 2207/20164; G06T 2207/30196; G06T 2207/30212; G06T 2207/30252; G06T 7/248; G06T 7/579; G06T 7/593; G06T 7/74
See application file for complete search history.

(56) References Cited

U.S. PATENT DOCUMENTS

| 7,925,049 B2 | 4/2011 | Zhu et al. |
| 9,747,668 B2 | 8/2017 | Yucer et al. |
| 2008/0144925 A1 | 6/2008 | Zhu et al. |
| 2011/0060496 A1* | 3/2011 | Nielsen .............. G06Q 10/0631 701/31.4 |

(Continued)

FOREIGN PATENT DOCUMENTS

EP 2958054 A2 12/2015

OTHER PUBLICATIONS

Pereira et al., "Backward Motion for Estimation Enhancement in Sparse Visual Odometry," Conference Paper, published in: 2017 Workshop of Computer Vision (WVC), Oct. 2017, pp. 61-66.

(Continued)

*Primary Examiner* — Quan M Hua
(74) *Attorney, Agent, or Firm* — Ditthavong & Steiner, P.C.

(57) ABSTRACT

An approach is provided for feature triangulation from images. The approach includes retrieving the plurality of images, wherein the plurality of images is captured by a sensor of a vehicle during a drive; determining a vehicle trajectory of the vehicle during the drive; selecting a first image and a second image from the plurality of images, wherein the first image and second image are arranged in reverse time order based on respective image capture times determined using the vehicle trajectory; after detecting the feature in the first image, processing the second image to detect the feature and to associate the feature as detected in the second image with the feature previously detected in the first image; and processing the detected feature in the first image and the second image to triangulate the location of the feature.

17 Claims, 9 Drawing Sheets

(56) References Cited

U.S. PATENT DOCUMENTS

2018/0292214 A1* 10/2018 Zhang .................. G01C 21/005
2019/0011921 A1* 1/2019 Wang .................... B64C 39/024

OTHER PUBLICATIONS

Mur-Artal et al., "ORB-SLAM2: an Open-Source SLAM System for Monocular, Stereo and RGB-D Cameras", Jul. 19, 2017, 9 pages.
Hartley et al., "Multiple View Geometry in Computer Vision, Second Edition", Mar. 2004, retrieved on Dec. 4, 2018 from http://www.robots.ox.ac.uk/~vgg/hzbook, 2 pages.
Office Action for related European Patent Application No. 19213170. 4-1210, dated Apr. 8, 2020, 9 pages.
Thrun et al. "Stanley: The robot that won the DARPA Grand Challenge", vol. 23, No. 9, Sep. 25, 2006, 32 pages.

* cited by examiner

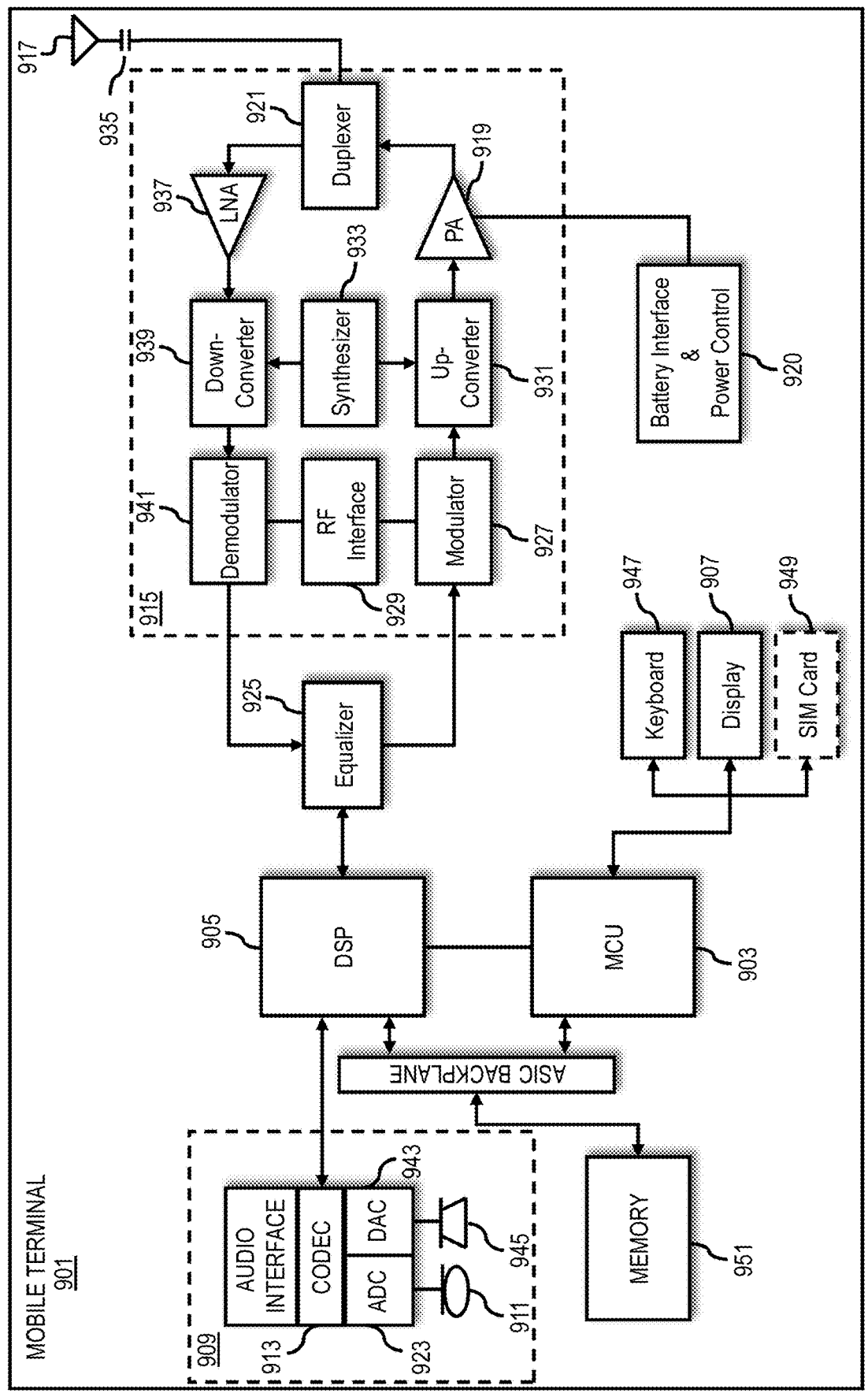

METHOD AND APPARATUS FOR PROVIDING FEATURE TRIANGULATION

BACKGROUND

Modern location-based services and applications (e.g., autonomous driving) are increasingly demanding highly accurate and detailed digital map data (e.g., centimeter-level accuracy or better) across wide geographic areas. To achieve such levels of coverage, map service providers have relied on data (e.g., imagery) collected from a variety of sources with different views or perspectives (e.g., ground-level imagery for surface vehicles, etc.). Observed key points (e.g., identified map features) between pairs of these images can then be used in combination with camera pose information to triangulate a real-world location of the corresponding feature. However, service providers face significant technical challenges to ensuring accuracy of this triangulation particularly when the features are small relative to an image frame (e.g., cover a small number of pixels in the image), which makes feature identification challenging.

Some Example Embodiments

Therefore, there is a need for an approach to providing a higher accuracy reconstruction or triangulation of a feature location from image data.

According to one embodiment, a method comprises retrieving the plurality of images. The plurality of images is captured by a sensor of a vehicle during a drive; determining a vehicle trajectory of the vehicle during the drive. The method also comprises selecting a first image and a second image from the plurality of images. The first image and second image are arranged in reverse time order based on respective image capture times determined using the vehicle trajectory. After detecting the feature in the first image, the method further comprises processing the second image to detect the feature and to associate the feature as detected in the second image with the feature previously detected in the first image. The method further comprises processing the detected feature in the first image and the second image to triangulate the location of the feature.

According to another embodiment, an apparatus comprises at least one processor; and at least one memory including computer program code for one or more programs, the at least one memory and the computer program code configured to, with the at least one processor, cause the apparatus to retrieve the plurality of images. The plurality of images is captured by a sensor of a vehicle during a drive; determine a vehicle trajectory of the vehicle during the drive. The apparatus is further caused to select a first image and a second image from the plurality of images. The first image and second image are arranged in reverse time order based on respective image capture times determined using the vehicle trajectory. After detecting the feature in the first image, the apparatus is further caused to process the second image to detect the feature and to associate the feature as detected in the second image with the feature previously detected in the first image. The apparatus is further caused to process the detected feature in the first image and the second image to triangulate the location of the feature.

According to another embodiment, a computer-readable storage medium carries one or more sequences of one or more instructions which, when executed by one or more processors, cause, at least in part, an apparatus to retrieve the plurality of images. The plurality of images is captured by a sensor of a vehicle during a drive; determine a vehicle trajectory of the vehicle during the drive. The apparatus is further caused to select a first image and a second image from the plurality of images. The first image and second image are arranged in reverse time order based on respective image capture times determined using the vehicle trajectory. After detecting the feature in the first image, the apparatus is further caused to process the second image to detect the feature and to associate the feature as detected in the second image with the feature previously detected in the first image. The apparatus is further caused to process the detected feature in the first image and the second image to triangulate the location of the feature.

An apparatus comprises means for retrieving the plurality of images. The plurality of images is captured by a sensor of a vehicle during a drive; determining a vehicle trajectory of the vehicle during the drive. The apparatus also comprises means for selecting a first image and a second image from the plurality of images. The first image and second image are arranged in reverse time order based on respective image capture times determined using the vehicle trajectory. After detecting the feature in the first image, the apparatus further comprises means for processing the second image to detect the feature and to associate the feature as detected in the second image with the feature previously detected in the first image. The apparatus further comprises means for processing the detected feature in the first image and the second image to triangulate the location of the feature.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the steps of any of the originally filed method claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 9 is a diagram of a mobile terminal (e.g., handset, vehicle, or component thereof) that can be used to implement an embodiment.

DESCRIPTION OF SOME EMBODIMENTS

Examples of a method, apparatus, and computer program for triangulating a location of a feature from a plurality of images are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
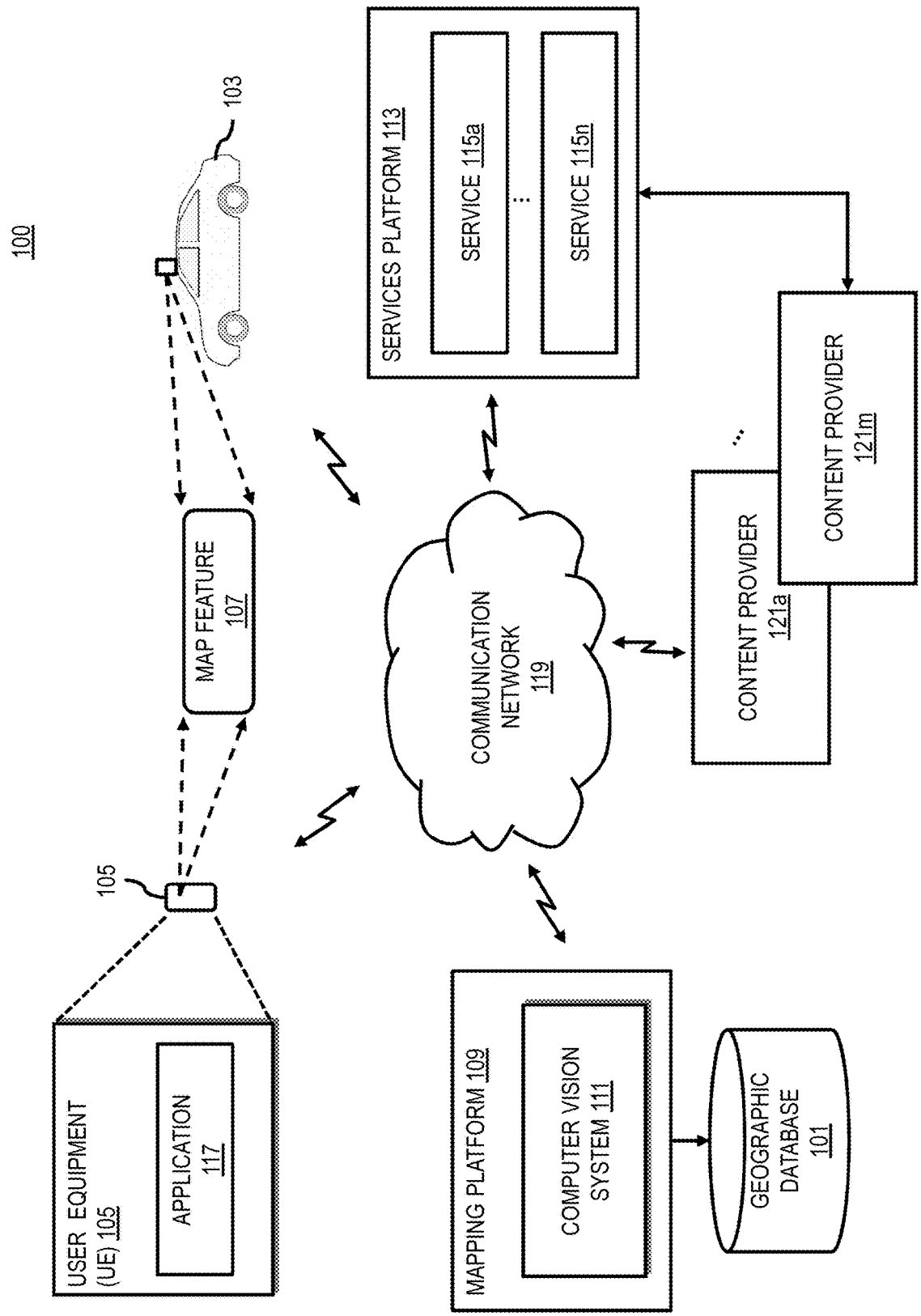
FIG. 1 is a diagram of a system capable of triangulating a location of a feature from images, according to one embodiment.

FIG. 1 is a diagram of a system capable of triangulating a location of a feature from images, according to one embodiment. Reconstruction of a three-dimensional (3D) environment from two-dimensional (2D) image-based observations is an important function for creating digital map data. The reconstruction process, for instance, is called triangulation, and uses the same observed key point (e.g., image location of an observed object or feature) between pairs of image frames and their associated camera pose information to triangulate the 2D feature (e.g., the image location of the 2D feature) into a 3D environment, e.g., as geographic coordinates (e.g., latitude, longitude, elevation). The 3D triangulated features (e.g., feature geocoordinates) are then used to construct digital map (e.g., as stored in a geographic database 101).

Generally, traditional triangulation approaches take image data (e.g., a sequence of image frames) collected by a camera sensor of a vehicle 103 and/or device (e.g., user equipment (UE) 105) in chronological order. Because of this, in the traditional triangulation approaches the feature points (e.g., road paint, signs, poles, etc.) towards the horizon appear at the center of the images first because they are farther away and move outward from the focus-of-expansion in each subsequently collected image as the vehicle 103 and/or UE 105 move towards the features. By starting from the first chronological images of an image sequence, the same feature in earlier pairs of image frames of the sequence are usually located at the center with little change between the two images of each pair. In other words, the parallax difference between the same feature is each pair can be very small due to proximity to the image center. This, in turn, can lead to large triangulation errors because triangulation depends on parallax to translate an image or pixel location of the observed feature to a real world 3D coordinate. Other triangulation approaches, such as simultaneous localization and mapping (SLAM), also suffer from reconstruction of the 3D features if the associated features appear close to the image center, and consequently lack parallax.

Figure 2:
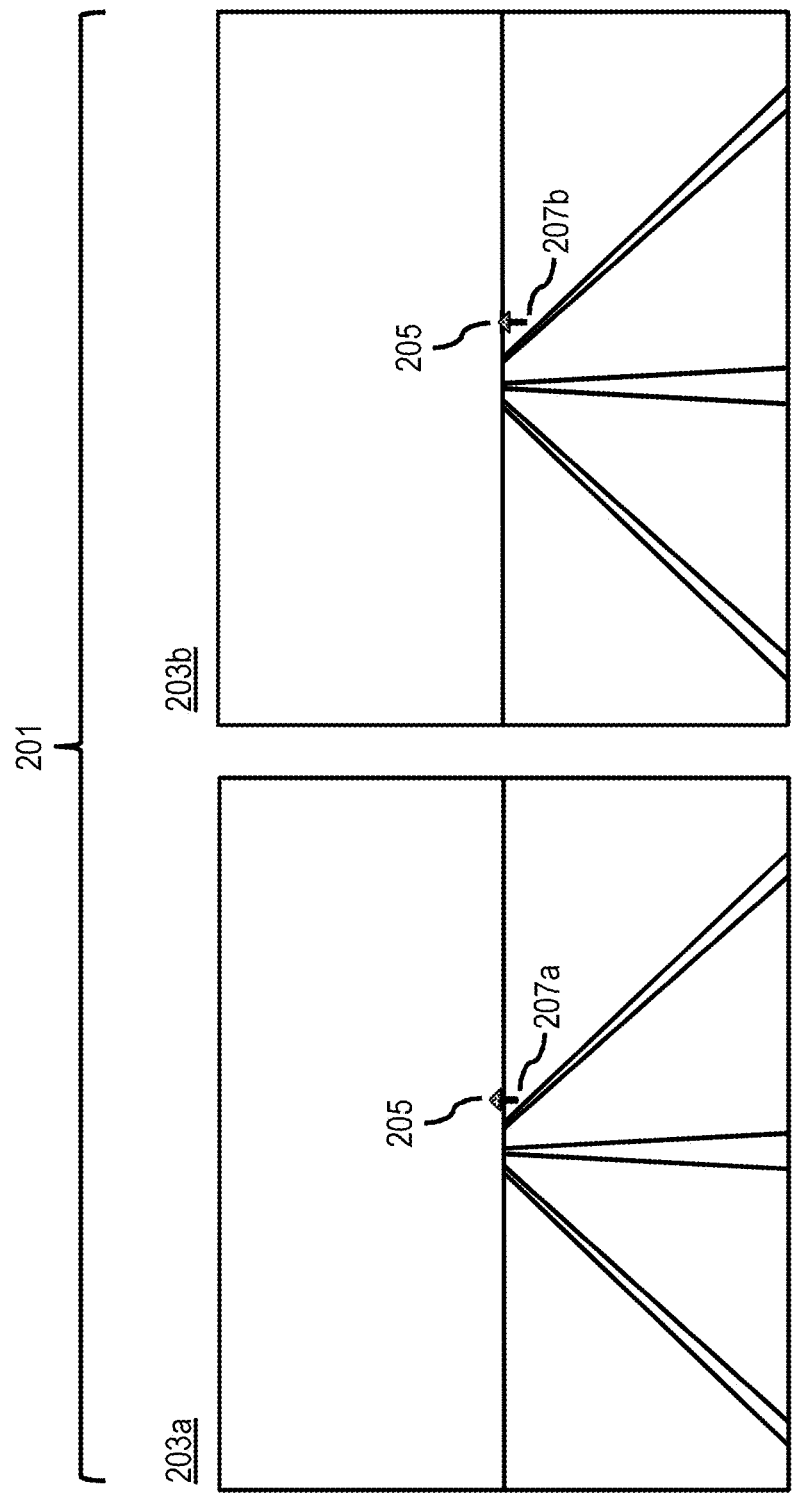
FIG. 2 is a diagram of an example pair of images, according to one embodiment.

This parallax problem is illustrated in the example FIG. 2. As shown in FIG. 2, an example image pair 201 includes a first image 203a collected earlier in time than a second image 203b. By way of example, the image pair 201 can be part of a sequence of images collected by a camera sensor of the vehicle 103. The image sequences can be collected as an image stream every designated time interval (e.g., every second, 5 seconds, etc.) or can be a video stream (e.g., a sequence of image frames collected 24, 30, 60, etc. times a second) to show a drive taken by the vehicle 103. In this example, image 203a depicts a sign 205 off in the distance near the horizon and center of the image with a pixel location 207a, and image 203b depicts the same sign 205 at a slightly later time in the drive at pixel location 207b. Because the drive is still early in the image sequence, the parallax (e.g., difference in apparent location of the sign 205) between the image locations 207a and 207b of the sign is also very small. As indicated above this can lead to large triangulation errors. In addition, because the sign 205 is still relatively small in both images, the pixel data representing the sign 205 in each image is also relatively. This small amount of pixel data can also make it more difficult for a feature detector (e.g., based on computer vision or a perception stack) to detect and identify the sign 205. Failure to detect can also reduce the system 100's ability to perform triangulation with accuracy.

Accordingly, service providers face significant technical challenges to improving the accuracy of traditional approaches to feature detection and triangulation to generate accurate 3D map data from image data.

To address these technical challenges, the system 100 of FIG. 1 introduces a capability to use additional sensor data collected from the vehicle 103 and/or UE 105 (e.g., vehicle or probe trajectory data) to re-sequence the image frames so that images in which the features (e.g., a map feature 107) that appear larger are processed first to triangulate their respective 3D locations. In other words, the system 100 provides a solution to the issue of lack of parallax between associated features 107 by leverage data that is available (e.g., vehicle trajectory data) to indicate a capture sequence of the images to reverse the chronological order of the images. For example, the system 100 runs the vehicle trajectory in reverse to correspondingly reverse the chronological order of a sequence of images captured during a drive by the vehicle 103 or UE 105, such that the features 107 present in the images appear at the edges of the image and move inward to the image center. This reverse ordering and triangulation of the image data advantageously provides for better parallax and in turn improved 3D triangulations. that are to be used for triangulation appear larger.

Figure 3:
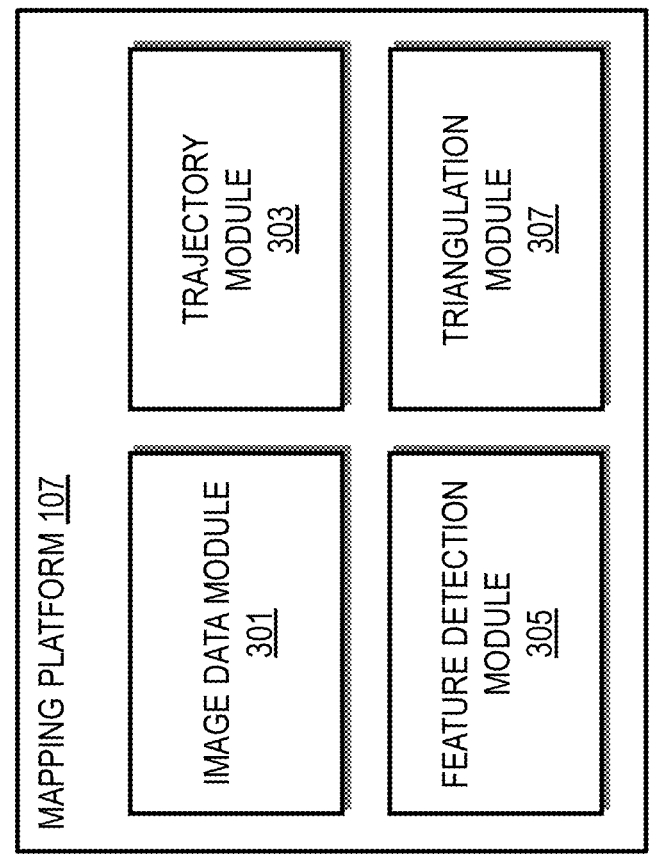
FIG. 3 is a diagram of the components of the mapping platform, according to one embodiment.

In one embodiment, the system 100 includes a mapping platform 109 for triangulating feature locations from images alone or in combination with a computer vision system 111 (e.g., a machine learning-based feature detector) according to the embodiments described herein. As shown in FIG. 3, the mapping platform 109 includes an image data module 301, a trajectory module 303, a feature detection module 305, and a triangulation module 307. The above presented modules and components of the mapping platform 109 can be implemented in hardware, firmware, software, or a combination thereof. It is contemplated that the functions of these components may be combined or performed by other components of equivalent functionality. Though depicted as a separate entity in FIG. 1, it is contemplated the mapping platform 109 may be implemented as a module of any of the components of the system 100. For example, the mapping platform 109 can be a component of the a services platform 113 and/or any of the services 115a-115n (also collectively referred to as services 115 of the services platform 113). In one embodiment, the mapping platform 109 and/or any of the modules 301-307 may be implemented as a cloud-based service, local service, native application, or combination thereof. The functions of the mapping platform 109 and/or these modules are discussed with respect to FIGS. 4 and 5A-5B below.

Figure 4:
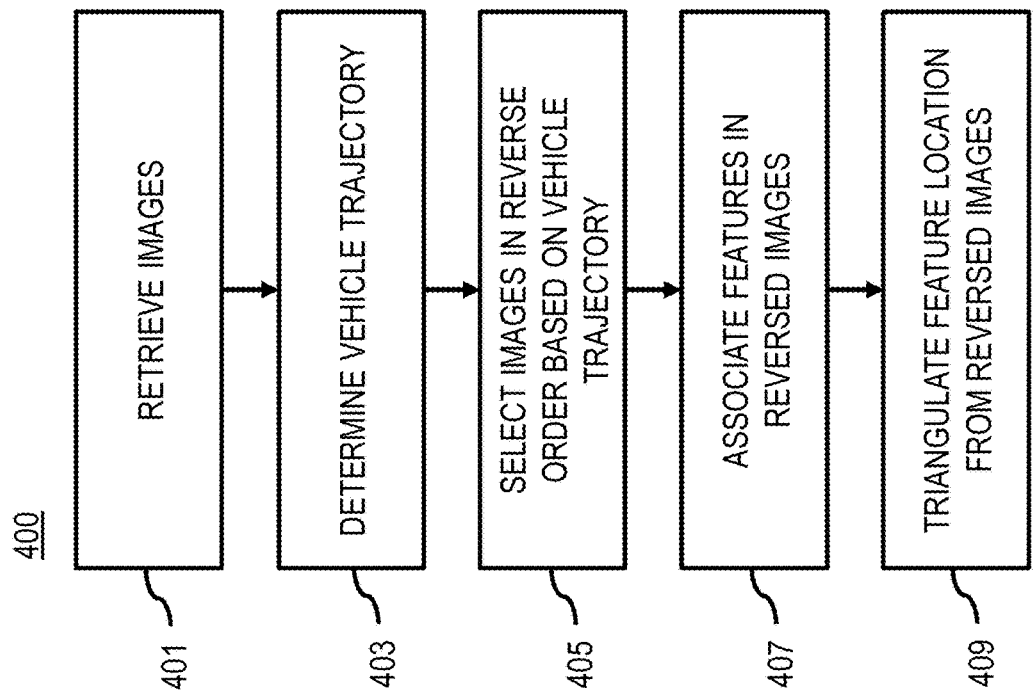
FIG. 4 is a flowchart of a process for, at least, triangulating of a location of a feature from images, according to one embodiment.
Figure 8:
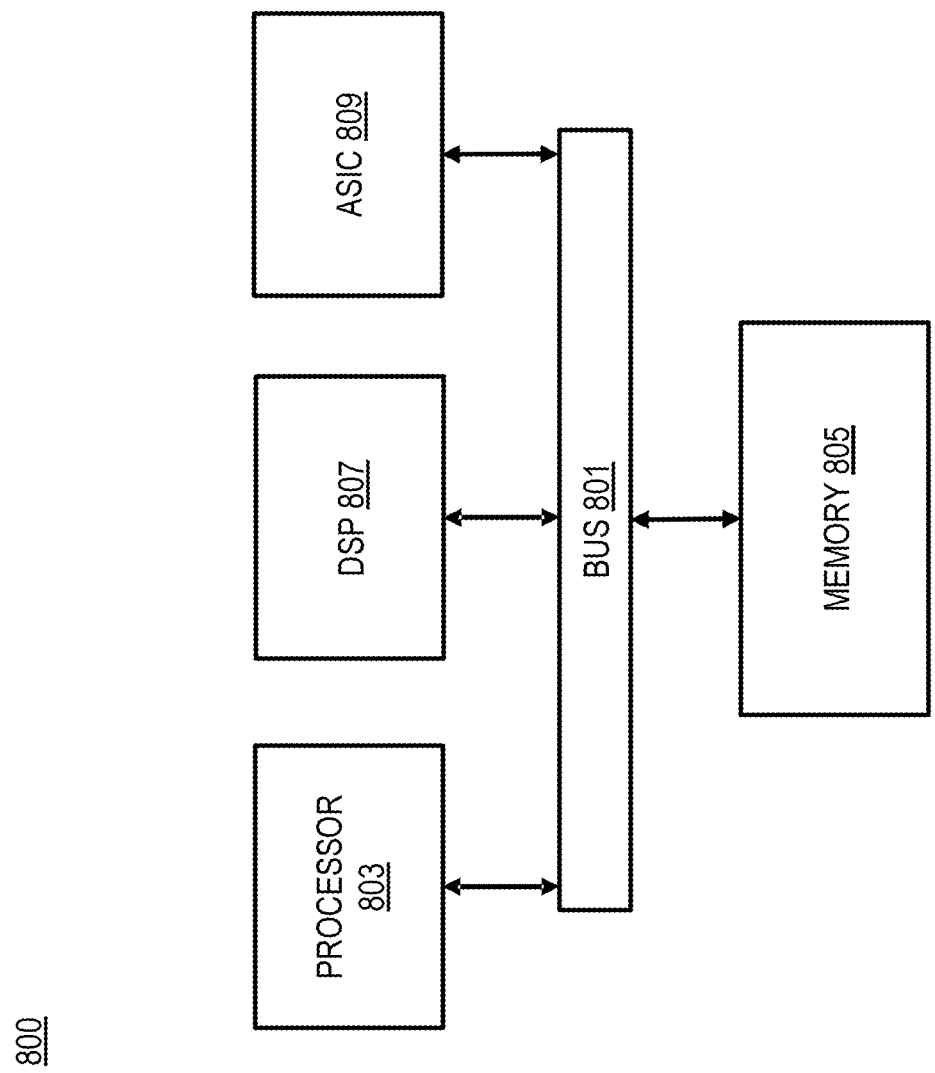
FIG. 8 is a diagram of a chip set that can be used to implement an embodiment.

FIG. 4 is a flowchart of a process 400 for, at least, triangulating a location of a feature from a plurality of images, according to one embodiment. In various embodiments, the mapping platform 109 and/or any of the modules 301-307 may perform one or more portions of the process 400 and may be implemented in, for instance, a chip set including a processor and a memory as shown in FIG. 8. As such, the mapping platform 109 and/or any of the modules 301-307 can provide means for accomplishing various parts of the process 400, as well as means for accomplishing embodiments of other processes described herein in conjunction with other components of the system 100. Although the process 300 is illustrated and described as a sequence of steps, its contemplated that various embodiments of the process 400 may be performed in any order or combination and need not include all of the illustrated steps.

In step 401, the image data module 301 retrieves a plurality of images. The plurality of images is captured by a sensor of a vehicle (e.g., vehicle 103 and/or other device such as the UE 105) during a drive so that the images depict features, roads, and/or other environmental features or objects encountered by the vehicle during the drive. It is noted that the any discussion of vehicle in the embodiments described herein are applicable to the vehicle 103, UE 105, and/or any other platform/system capable of capturing the sequence of images described herein. The sensor can be a camera sensor or other type of sensor capable of capturing or producing image data, and wherein the pose data of the camera or sensor indicates a camera position, a camera pointing direction, a camera field of view, or a combination thereof corresponding to each image. The camera sensors and/or other components of the vehicle 103 or UE 105 are configured to run perception algorithms on the data (e.g., imagery) acquired during the drive. The images can be used to detect any photo-identifiable feature contained in the images. The images can be captured by the camera sensor as still images captured every predetermined period of time or video captured.

In step 403, the trajectory module 303 determines a trajectory of the vehicle taken during the drive. The vehicle trajectory includes data relating to the path or direction of the moving vehicle along a path during the drive. The data relating to vehicle trajectory can be available offline. The vehicle trajectory further includes data indicating that the vehicle is traveling towards the feature during the drive. The vehicle trajectory is a time-ordered sequence of location probe points determined by one or more location sensors of the vehicle. The location sensor can include a satellite-based location sensors (e.g., GPS/GNSS), inertial measurement sensors which can increase the localization accuracy by taking into account the vehicle movement, and/or any other location sensor equipped or available to the vehicle 103 and/or UE 105. The vehicle trajectory includes probe data that provides time ordered data points, wherein each point provides a vehicle location, heading, and/or equivalent telemetry data that is time stamped. Vehicle speed can also be calculated between any two data points. The vehicle may include GPS or other satellite-based receivers to obtain geographic coordinates from satellites for determining current location and time. Further, the location can be determined by visual odometry, triangulation systems such as A-GPS, Cell of Origin, or other location extrapolation technologies.

In step 405, the image data module 301 is configured to select at least a first image and a second image from the plurality of images. The image selection module 301 is further configured to arrange the first image and second image in a reverse time order based on respective image capture times determined by using the vehicle trajectory. In other words, the first image was captured at a later time and at a different location than the second image during the drive. Subsequent images will also be arranged reverse time order. In addition or alternatively, the images can be arranged according to an image size of the detected feature and/or proximity to an image edge so that the first image depicts a feature that is also present in the second image at a size that is larger or closer to an image edge than in the second image.

In step 407, after detecting the feature in the first image, the feature detection module 305 processes the second image to detect the same feature and to associate the feature as detected in the second image with the feature previously detected in the first image. In other words, the feature detection module 305 identifies a feature that appears in both the first and second images. In one embodiment, the feature detection module 305 includes or interacts with the computer vision system 111 to recognize and detect features (e.g., road paint, signs, poles, and/or any other photo-identifiable feature) across multiple images using a trained machine learning model (e.g., a neural network, support vector machine, decision trees, etc.). As described previously, the images are arranged so that a first image size of the feature in the first image appears larger than a second image size of the feature in the second image. This is due to the fact that the vehicle is closer to the feature in the first image and the vehicle is further away from the feature in the second image and subsequent images. This is because, in one embodiment, the camera is mounted facing forward in the direction of travel and the sequence of images has been reversed based on the vehicle trajectory. Further, in certain embodiments, the first image position of the feature in the first image is closer to an image edge than a second image position of the feature in the second image. The second image position of the feature in the second image and subsequent images moves closer to an image center. Again, this is a consequence of the reversed ordering based on the vehicle trajectory data and the forward facing camera pointing direction. The feature can be any photo-identifiable feature in the images and located at different locations in the images. In certain examples, the feature can initially appear at an image center and remain substantially at the lateral image center in subsequent images, although the feature will increase in size as the vehicle continues to approach the feature and then move towards the top edge of the image as the vehicle approaches passes underneath. This type of feature could be an overhead traffic signal or road sign that is position over the roadway. Similarly, a feature embedded in the roadway (e.g., a sewer cover) can also appear approximately at the lateral center but move towards the bottom edge of the image as the vehicle approaches and passes by.

In step 409, the triangulation module 307 processes the detected feature in the first image and the second image to triangulate the location of the feature. The location of the feature is triangulated based on sensor pose data, such as camera pose data, for the first image and the second image, and respective image locations of the detected feature in the first image frame and the second image frame. The processing of the detected feature in the first image and the second image includes calculating a parallax value. A parallax is a displacement or difference in the apparent position of a feature viewed along two different lines of sight, and is measured by the angle or semi-angle of inclination between those two lines. A closer feature has a larger parallax than more distant features when observed from different positions, so parallax can be used to determine distances. The feature is further triangulated based on the calculated parallax value. The approach of the present invention improves the reconstruction, i.e., triangulation of a location of the feature from images and using these improved triangulated results to construct or update digital maps.

In one embodiment, it is contemplated that the embodiments of feature triangulation approach described herein can be applied across any type of feature triangulation approach. This is provided that data such as vehicle trajectory data is available to reverse the order of images with respect to their capture times, and/or that the observed feature (such as a road sign) appears in and leaves the field of view as the vehicle drives past the feature.

Figure 5A:
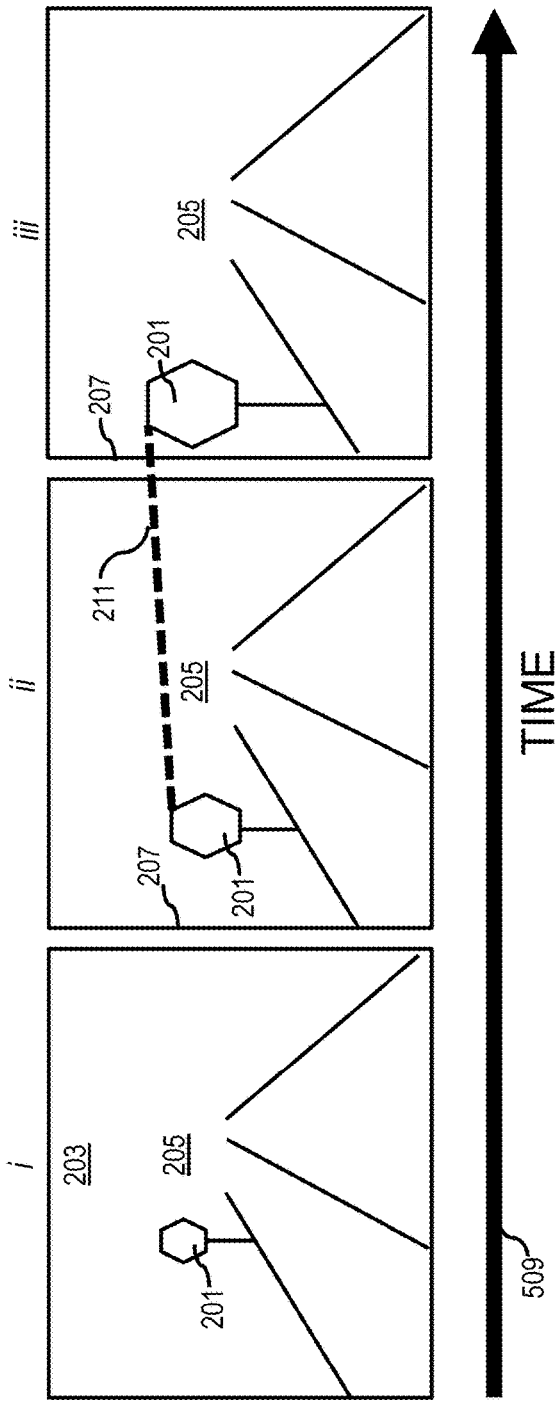
FIGS. 5A and 5B illustrate a comparison between a traditional triangulation (FIG. 5A) and a triangulation based on reverse image sequent, according to one embodiment.
Figure 5B:
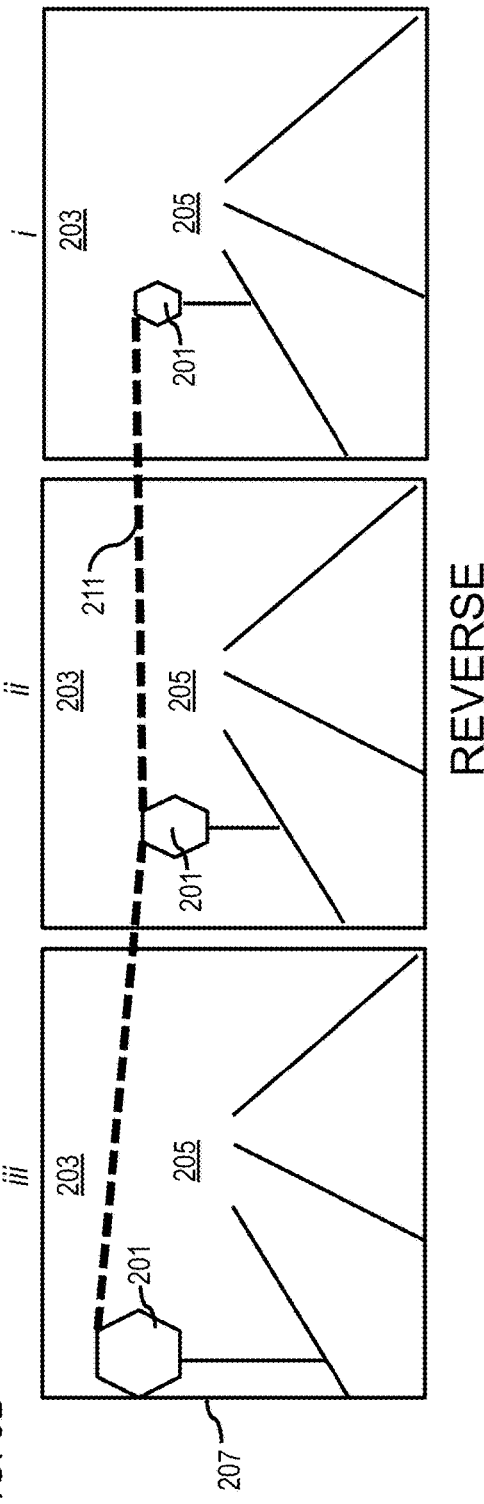

FIGS. 5A and 5B illustrate a comparison between traditional triangulation (FIG. 5A) and the triangulation method according to the embodiments described herein (FIG. 5B) that provides higher accuracy triangulations where camera pose, and associated image-based observations are available. As shown in FIG. 5A, with traditional triangulation approaches, the feature 501 towards the horizon 505 appears closer to the center 503 of image i and moves outward toward the edge 507 of images ii and iii from the focus-of-expansion over time represented by directional arrow 509.

With traditional techniques, when two frames observe the same feature, the parallax due to proximity to the image center 503 leads to large triangulation errors. Feature association 511 exists between images ii and iii, however the feature association 511 is missing in image i due to the feature being smaller and closer to center 503 and therefore more difficult for the computer vision system 111 to detect without a prior association to other images. The feature 501 in FIG. 5A is a road sign and is initially small in image i and grows larger in size as it comes closer to the moving vehicle in images ii and iii. Feature association 511 fails with this traditional approach because the feature 501 is of small size in image i and the only feature association 511 occurs when the feature 501 is larger in images ii and iii, which leads to a small parallax and larger triangulation error.

In the example of FIG. 5B, images i, ii, and iii are processed in reverse time order according to the embodiments of the triangulation approach described herein. For example, the mapping platform 109 is used to perform the reverse time order based on available data such as vehicle trajectory data. The feature 501 appears larger in image iii and decreases in size in subsequent images ii and i. Feature association 511 therefore exists between each of images iii, ii, and i. No missing feature association is present with the present methodology that utilizes reverse time order of the captured images because the initial or baseline association is performed first on images where the feature is likely to be larger in image size and therefore easier for the computer vision system 111 to detect accurately. The embodiments of the triangulation approach described herein significantly improve the quality of the triangulated results by solving the problem of lack of parallax between the associated features by leveraging offline data that is available.

In the example of FIG. 5B the vehicle trajectory data (e.g., indicating vehicle pose data such as vehicle location and heading) and associated features are processed in reverse, such that the feature 501 appears at the edge 507 of image iii and moves further inward to the center 503 of images ii and i. In this way, the embodiments described herein improve parallax and in-turn improves triangulations. In the example of FIG. 5B, the observed feature 501 is represented as a road sign, but can be any photo-identifiable feature adjacent a road segment such as a light post, mileage marker, traffic light, building, monument, etc. With the reverse time order arrangement, the image with the larger feature size will be processed first.

In FIG. 5B, when image frames are processed in reverse order, the feature 501 (e.g., sign) appears large initially in image frame iii, and the feature association 511 between frames i, ii, and iii is successful. The feature association 511 can now be performed for feature 501 of a smaller size in image i. Since feature 501 in image frame iii serves as the baseline, and is much larger, the triangulation accuracy is improved. The data obtained and/or processed in the example of FIG. 5B, can be available offline in certain embodiments.

Returning to FIG. 1, in one embodiment, the mapping platform 109 has connectivity over a communication network 119 to the services platform 113 that provides one or more services 115. By way of example, the services 115 may also be other third-party services and include mapping services, navigation services, travel planning services, notification services, social networking services, content (e.g., audio, video, images, etc.) provisioning services, application services, storage services, contextual information determination services, location-based services, information-based services (e.g., weather, news, etc.), etc. In one embodiment, the services platform 113 uses the output of the mapping platform 109 (e.g., triangulated features or map data generated therefrom) to provide services such as navigation, mapping, other location-based services, etc.

In one embodiment, the mapping platform 109 may be a platform with multiple interconnected components and may include multiple servers, intelligent networking devices, computing devices, components and corresponding software for predicting sensor error. In addition, it is noted that the mapping platform 109 may be a separate entity of the system 100, a part of the one or more services 115, a part of the services platform 113, or included within the vehicle 103 and/or UE 105 (e.g., as an application 117).

In one embodiment, content providers 121a-121k (collectively referred to as content providers 121) may provide content or data (e.g., including geographic data based on feature triangulation, sensor data, etc.) to a geographic database 101, the mapping platform 109, the services platform 113, the services 115, and the vehicle 103. The content provided may be any type of content, such as map content, textual content, audio content, video content, image content, etc. In one embodiment, the content providers 121 may provide content that may aid in predicting sensor error. In one embodiment, the content providers 121 may also store content associated with the geographic database 101, mapping platform 109, services platform 113, services 115, and/or vehicle 103. In another embodiment, the content providers 121 may manage access to a central repository of data, and offer a consistent, standard interface to data, such as a repository of the geographic database 101.

By way of example, the UE 105 can be any type of embedded system, mobile terminal, fixed terminal, or portable terminal including a built-in navigation system, a personal navigation device, mobile handset, station, unit, device, multimedia computer, multimedia tablet, Internet node, communicator, desktop computer, laptop computer, notebook computer, netbook computer, tablet computer, personal communication system (PCS) device, personal digital assistants (PDAs), audio/video player, digital camera/camcorder, positioning device, fitness device, television receiver, radio broadcast receiver, electronic book device, game device, or any combination thereof, including the accessories and peripherals of these devices, or any combination thereof. It is also contemplated that the UE 105 can support any type of interface to the user (such as "wearable" circuitry, etc.). In one embodiment, the UE 105 may be associated with the vehicle 103 or be a component part of the vehicle 103.

In one embodiment, the vehicle 103 is configured with various sensors for generating or collecting vehicular sensor data (e.g., imagery data, vehicle trajectory data, etc.), and related geographic/map data, etc. In one embodiment, the sensed data represent sensor data associated with a geographic location or coordinates at which the sensor data was collected. In this way, the sensor data can act as observation data that can be aggregated into location-aware training and evaluation data sets. By way of example, the sensors may include a RADAR system, a LiDAR system, a global positioning sensor for gathering location data (e.g., GPS), a network detection sensor for detecting wireless signals or receivers for different short-range communications (e.g., Bluetooth, Wi-Fi, Li-Fi, near field communication (NFC) etc.), temporal information sensors, a camera/imaging sensor for gathering image data, an audio recorder for gathering audio data, velocity sensors mounted on steering wheels of the vehicles, switch sensors for determining whether one or more vehicle switches are engaged, and the like.

Other examples of sensors of the vehicle 103 may include light sensors, orientation sensors augmented with height sensors and acceleration sensor (e.g., an accelerometer can measure acceleration and can be used to determine orientation of the vehicle), tilt sensors to detect the degree of incline or decline of the vehicle along a path of travel, moisture sensors, pressure sensors, etc. In a further example embodiment, sensors about the perimeter of the vehicle 103 may detect the relative distance of the vehicle from a physical divider, a lane or roadway, the presence of other vehicles, pedestrians, traffic lights, potholes and any other objects, or a combination thereof. In one scenario, the sensors may detect weather data, traffic information, or a combination thereof. In one embodiment, the vehicle 103 may include GPS or other satellite-based receivers to obtain geographic coordinates from satellites for determining current location and time. Further, the location can be determined by visual odometry, triangulation systems such as A-GPS, Cell of Origin, or other location extrapolation technologies. In yet another embodiment, the sensors can determine the status of various control elements of the car, such as activation of wipers, use of a brake pedal, use of an acceleration pedal, angle of the steering wheel, activation of hazard lights, activation of head lights, etc.

In one embodiment, the communication network 119 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

By way of example, the mapping platform 109, services platform 113, services 115, vehicle 103, and/or content providers 121 communicate with each other and other components of the system 100 using well known, new or still developing protocols. In this context, a protocol includes a set of rules defining how the network nodes within the communication network 119 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 6:
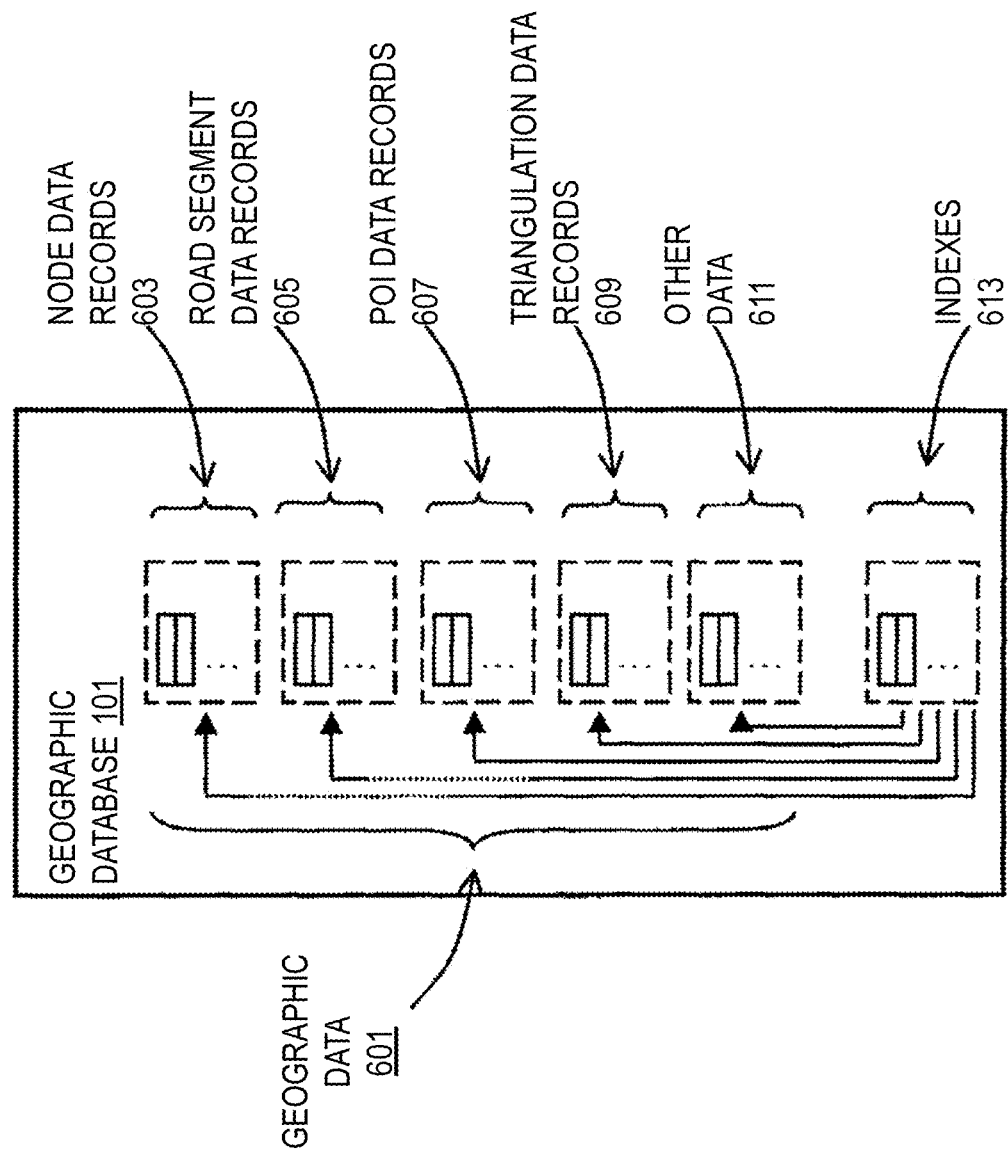
FIG. 6 is a diagram of a geographic database of the system, according to one embodiment.

FIG. 6 is a diagram of a geographic database, according to one embodiment. In one embodiment, the geographic database 101 includes geographic data 601 used for (or configured to be compiled to be used for) mapping and/or navigation-related services. In one embodiment, geographic features (e.g., two-dimensional or three-dimensional features) are represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions. Accordingly, the terms polygons and polygon extrusions as used herein can be used interchangeably.

In one embodiment, the geographic database 101 includes high resolution or high definition (HD) mapping data that provide centimeter-level or better accuracy of map features. For example, the geographic database 101 can be based on Light Detection and Ranging (LiDAR) or equivalent technology to collect billions of 3D points and model road surfaces, structures, buildings, terrain, and other map features down to the number lanes and their widths. In one embodiment, the HD mapping data capture and store details such as the slope and curvature of the road, parking spots, lane markings, roadside objects such as sign posts, including what the signage denotes, etc. By way of example, the HD mapping data enable highly automated vehicles to precisely localize themselves on the road, and to determine road attributes (e.g., learned speed limit values) to at high accuracy levels.

In one embodiment, geographic features (e.g., two-dimensional or three-dimensional features) are represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions. Accordingly, the terms polygons and polygon extrusions as used herein can be used interchangeably. In one embodiment, the following terminology applies to the representation of geographic features in the geographic database 101.

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non-reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the geographic database 101 follows certain conventions. For example, links do not cross themselves and do not cross each other except at a node. Also, there are no duplicated shape points, nodes, or links. Two links that connect each other have a common node. In the geographic database 101, overlapping geographic features are represented by overlapping polygons. When polygons overlap, the boundary of one polygon crosses the boundary of the other polygon. In the geographic database 101, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

As shown, the geographic database 101 includes node data records 603, road segment or link data records 605, POI data records 607, triangulation data records 609, other records 611, and indexes 613, for example. More, fewer or different data records can be provided. In one embodiment, additional data records (not shown) can include cartographic ("cartel") data records, routing data, and maneuver data. In one embodiment, the indexes 613 may improve the speed of data retrieval operations in the geographic database 101. In one embodiment, the indexes 613 may be used to quickly locate data without having to search every row in the geographic database 101 every time it is accessed. For example, in one embodiment, the indexes 613 can be a spatial index of the polygon points associated with stored feature polygons.

In exemplary embodiments, the road segment data records 605 are links or segments representing roads, streets, or paths, as can be used in the calculated route or recorded route information for determination of one or more personalized routes. The node data records 603 are end points corresponding to the respective links or segments of the road segment data records 605. The road link data records 605 and the node data records 603 represent a road network, such as used by vehicles, cars, and/or other entities. Alternatively, the geographic database 101 can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 101 can include data about the POIs and their respective locations in the POI data records 607. The geographic database 101 can also include data about places, such as cities, towns, or other communities, and other geographic features, such as bodies of water, mountain ranges, etc. Such place or feature data can be part of the POI data records 607 or can be associated with POIs or POI data records 607 (such as a data point used for displaying or representing a position of a city).

In one embodiment, the geographic database 101 can also include triangulation data records 609 for storing image pairs, image sequences, detected features, vehicle trajectories, triangulation results, feature associations, and/or related data generated or consumed in the embodiments described herein. In one embodiment, triangulate features can be stored as data fields of the triangulation data data records 609. In one embodiment, the triangulation data records 609 can be associated with segments of a road link (as opposed to an entire link). It is noted that the segmentation of the road can be different than the road link structure of the geographic database 101. In other words, the segments can further subdivide the links of the geographic database 101 into smaller segments (e.g., of uniform lengths such as 5-meters). In this way, feature triangulation can be performed at a level of granularity that is independent of the granularity or at which the actual road or road network is represented in the geographic database 101.

In one embodiment, the geographic database 101 can be maintained by the content provider 121 in association with the services platform 113 (e.g., a map developer). The map developer can collect geographic data to generate and enhance the geographic database 101. There can be different ways used by the map developer to collect data. These ways can include obtaining data from other sources, such as municipalities or respective geographic authorities. In addition, the map developer can employ field personnel to travel by vehicle along roads throughout the geographic region to observe features (e.g., physical dividers, OPPO, VRU, etc.) and/or record information about them, for example. Also, remote sensing, such as aerial or satellite photography, can be used.

The geographic database 101 can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by the vehicle 103, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

The processes described herein for providing feature triangulation may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 7:
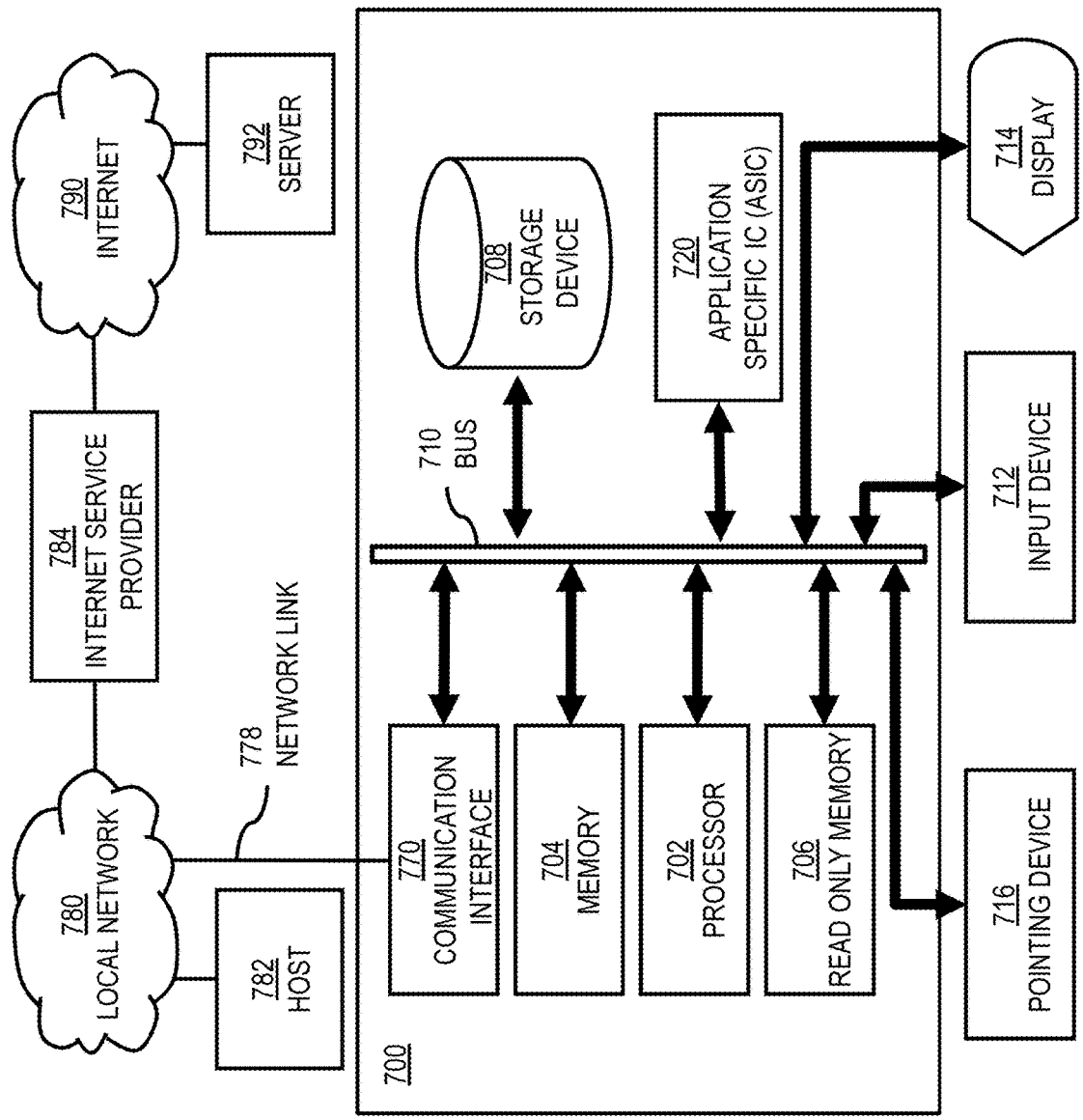
FIG. 7 is a diagram of hardware that can be used to implement an embodiment.

FIG. 7 illustrates a computer system 700 upon which an embodiment of the invention may be implemented. Computer system 700 is programmed (e.g., via computer program code or instructions) to provide feature triangulation as described herein and includes a communication mechanism such as a bus 710 for passing information between other internal and external components of the computer system 700. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 710 includes one or more parallel conductors of information so that information is transferred quickly among devices coupled to the bus 710. One or more processors 702 for processing information are coupled with the bus 710.

A processor 702 performs a set of operations on information as specified by computer program code related to providing feature triangulation. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 710 and placing information on the bus 710. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 702, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 700 also includes a memory 704 coupled to bus 710. The memory 704, such as a random access memory (RAM) or other dynamic storage device, stores information including processor instructions for providing feature triangulation. Dynamic memory allows information stored therein to be changed by the computer system 700. RANI allows a unit of information stored at a location called a memory address to be stored and retrieved independently of information at neighboring addresses. The memory 704 is also used by the processor 702 to store temporary values during execution of processor instructions. The computer system 700 also includes a read only memory (ROM) 706 or other static storage device coupled to the bus 710 for storing static information, including instructions, that is not changed by the computer system 700. Some memory is composed of volatile storage that loses the information stored thereon when power is lost. Also coupled to bus 710 is a non-volatile (persistent) storage device 708, such as a magnetic disk, optical disk or flash card, for storing information, including instructions, that persists even when the computer system 700 is turned off or otherwise loses power.

Information, including instructions for providing feature triangulation, is provided to the bus 710 for use by the processor from an external input device 712, such as a keyboard containing alphanumeric keys operated by a human user, or a sensor. A sensor detects conditions in its vicinity and transforms those detections into physical expression compatible with the measurable phenomenon used to represent information in computer system 700. Other external devices coupled to bus 710, used primarily for interacting with humans, include a display device 714, such as a cathode ray tube (CRT) or a liquid crystal display (LCD), or plasma screen or printer for presenting text or images, and a pointing device 716, such as a mouse or a trackball or cursor direction keys, or motion sensor, for controlling a position of a small cursor image presented on the display 714 and issuing commands associated with graphical elements presented on the display 714. In some embodiments, for example, in embodiments in which the computer system 700 performs all functions automatically without human input, one or more of external input device 712, display device 714 and pointing device 716 is omitted.

In the illustrated embodiment, special purpose hardware, such as an application specific integrated circuit (ASIC) 720, is coupled to bus 710. The special purpose hardware is configured to perform operations not performed by processor 702 quickly enough for special purposes. Examples of application specific ICs include graphics accelerator cards for generating images for display 714, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 700 also includes one or more instances of a communications interface 770 coupled to bus 710. Communication interface 770 provides a one-way or two-way communication coupling to a variety of external devices that operate with their own processors, such as printers, scanners and external disks. In general the coupling is with a network link 778 that is connected to a local network 780 to which a variety of external devices with their own processors are connected. For example, communication interface 770 may be a parallel port or a serial port or a universal serial bus (USB) port on a personal computer. In some embodiments, communications interface 770 is an integrated services digital network (ISDN) card or a digital subscriber line (DSL) card or a telephone modem that provides an information communication connection to a corresponding type of telephone line. In some embodiments, a communication interface 770 is a cable modem that converts signals on bus 710 into signals for a communication connection over a coaxial cable or into optical signals for a communication connection over a fiber optic cable. As another example, communications interface 770 may be a local area network (LAN) card to provide a data communication connection to a compatible LAN, such as Ethernet. Wireless links may also be implemented. For wireless links, the communications interface 770 sends or receives or both sends and receives electrical, acoustic or electromagnetic signals, including infrared and optical signals, that carry information streams, such as digital data. For example, in wireless handheld devices, such as mobile telephones like cell phones, the communications interface 770 includes a radio band electromagnetic transmitter and receiver called a radio transceiver. In certain embodiments, the communications interface 770 enables connection to the communication network 119 providing feature triangulation.

The term computer-readable medium is used herein to refer to any medium that participates in providing information to processor 702, including instructions for execution. Such a medium may take many forms, including, but not limited to, non-volatile media, volatile media and transmission media. Non-volatile media include, for example, optical or magnetic disks, such as storage device 708. Volatile media include, for example, dynamic memory 704. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

FIG. 8 illustrates a chip set 800 upon which an embodiment of the invention may be implemented. Chip set 800 is programmed to provide feature triangulation as described herein and includes, for instance, the processor and memory components described with respect to FIG. 7 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 800 includes a communication mechanism such as a bus 801 for passing information among the components of the chip set 800. A processor 803 has connectivity to the bus 801 to execute instructions and process information stored in, for example, a memory 805. The processor 803 may include one or more processing cores with each core configured to perform independently. A multi-core processor enables multiprocessing within a single physical package. Examples of a multi-core processor include two, four, eight, or greater numbers of processing cores. Alternatively or in addition, the processor 803 may include one or more microprocessors configured in tandem via the bus 801 to enable independent execution of instructions, pipelining, and multithreading. The processor 803 may also be accompanied with one or more specialized components to perform certain processing functions and tasks such as one or more digital signal processors (DSP) 807, or one or more application-specific integrated circuits (ASIC) 809. A DSP 807 typically is configured to process real-world signals (e.g., sound) in real time independently of the processor 803. Similarly, an ASIC 809 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 803 and accompanying components have connectivity to the memory 805 via the bus 801. The memory 805 includes both dynamic memory (e.g., RAM, magnetic disk, writable optical disk, etc.) and static memory (e.g., ROM, CD-ROM, etc.) for storing executable instructions that when executed perform the inventive steps described herein to provide feature triangulation. The memory 805 also stores the data associated with or generated by the execution of the inventive steps.

FIG. 9 is a diagram of exemplary components of a mobile terminal (e.g., vehicle 103, UE 105, or component thereof) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 903, a Digital Signal Processor (DSP) 905, and a receiver/transmitter unit including a microphone gain control unit and a speaker gain control unit. A main display unit 907 provides a display to the user in support of various applications and mobile station functions that offer automatic contact matching. An audio function circuitry 909 includes a microphone 911 and microphone amplifier that amplifies the speech signal output from the microphone 911. The amplified speech signal output from the microphone 911 is fed to a coder/decoder (CODEC) 913.

A radio section 915 amplifies power and converts frequency in order to communicate with a base station, which is included in a mobile communication system, via antenna 917. The power amplifier (PA) 919 and the transmitter/modulation circuitry are operationally responsive to the MCU 903, with an output from the PA 919 coupled to the duplexer 921 or circulator or antenna switch, as known in the art. The PA 919 also couples to a battery interface and power control unit 920.

In use, a user of mobile station 901 speaks into the microphone 911 and his or her voice along with any detected background noise is converted into an analog voltage. The analog voltage is then converted into a digital signal through the Analog to Digital Converter (ADC) 923. The control unit 903 routes the digital signal into the DSP 905 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 925 for compensation of any frequency-dependent impairments that occur during transmission though the air such as phase and amplitude distortion. After equalizing the bit stream, the modulator 927 combines the signal with a RF signal generated in the RF interface 929. The modulator 927 generates a sine wave by way of frequency or phase modulation. In order to prepare the signal for transmission, an up-converter 931 combines the sine wave output from the modulator 927 with another sine wave generated by a synthesizer 933 to achieve the desired frequency of transmission. The signal is then sent through a PA 919 to increase the signal to an appropriate power level. In practical systems, the PA 919 acts as a variable gain amplifier whose gain is controlled by the DSP 905 from information received from a network base station. The signal is then filtered within the duplexer 921 and optionally sent to an antenna coupler 935 to match impedances to provide maximum power transfer. Finally, the signal is transmitted via antenna 917 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 901 are received via antenna 917 and immediately amplified by a low noise amplifier (LNA) 937. A down-converter 939 lowers the carrier frequency while the demodulator 941 strips away the RF leaving only a digital bit stream. The signal then goes through the equalizer 925 and is processed by the DSP 905. A Digital to Analog Converter (DAC) 943 converts the signal and the resulting output is transmitted to the user through the speaker 945, all under control of a Main Control Unit (MCU) 903—which can be implemented as a Central Processing Unit (CPU) (not shown).

The MCU 903 receives various signals including input signals from the keyboard 947. The keyboard 947 and/or the MCU 903 in combination with other user input components (e.g., the microphone 911) comprise a user interface circuitry for managing user input. The MCU 903 runs a user interface software to facilitate user control of at least some functions of the mobile station 901 to provide feature triangulation. The MCU 903 also delivers a display command and a switch command to the display 907 and to the speech output switching controller, respectively. Further, the MCU 903 exchanges information with the DSP 905 and can access an optionally incorporated SIM card 949 and a memory 951. In addition, the MCU 903 executes various control functions required of the station. The DSP 905 may, depending upon the implementation, perform any of a variety of conventional digital processing functions on the voice signals. Additionally, DSP 905 determines the background noise level of the local environment from the signals detected by microphone 911 and sets the gain of microphone 911 to a level selected to compensate for the natural tendency of the user of the mobile station 901.

The CODEC 913 includes the ADC 923 and DAC 943. The memory 951 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 951 may be, but not limited to, a single memory, CD, DVD, ROM, RAM, EEPROM, optical storage, or any other non-volatile or non-transitory storage medium capable of storing digital data.

An optionally incorporated SIM card 949 carries, for instance, important information, such as the cellular phone number, the carrier supplying service, subscription details, and security information. The SIM card 949 serves primarily to identify the mobile station 901 on a radio network. The card 949 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method for triangulating a location of a feature from a plurality of images, the method comprising:
   retrieving the plurality of images, wherein the plurality of images is captured by a sensor of a vehicle during a drive;
   determining a vehicle trajectory of the vehicle during the drive;
   selecting a first image and a second image from the plurality of images, wherein the first image is captured later in time than the second image;
   re arranging the first image and second image in reverse time order based on respective image capture times determined using the vehicle trajectory so that the feature as depicted in the first image has a larger image size relative to the feature as depicted in the second image based on the re-arrangement;
   after detecting the feature with the larger image size in the first image, processing the second image to detect the feature and to associate the feature as detected in the second image with the feature previously detected in the first image; and
   processing the detected feature in the first image and the second image to triangulate the location of the feature.

2. The method of claim 1, wherein the location of the feature is triangulated based on sensor pose data for the first image and the second image, and respective image locations of the detected feature in the first image frame and the second image frame.

3. The method of claim 2, wherein the processing of the detected feature in the first image and the second image comprises calculating a parallax value, and wherein the feature is further triangulated based on the parallax value.

4. The method of claim 1, wherein a first image position of the feature in the first image is closer to an image edge than a second image position of the feature in the second image.

5. The method of claim 1, wherein the vehicle trajectory indicates that the vehicle is traveling towards the feature during the drive.

6. The method of claim 2, wherein the sensor is a camera sensor, and wherein the sensor pose data indicates a camera position, a camera pointing direction, a camera field of view, or a combination thereof.

7. The method of claim 1, wherein the vehicle trajectory is a time-ordered sequence of location probe points determined by a location sensor of the vehicle.

8. The method of claim 1, wherein the feature comprises a fixture positioned along a side of a roadway.

9. The method of claim 8, wherein the feature comprises a road sign or traffic light.

10. An apparatus for triangulating a location of a feature from a plurality of images comprising:
    at least one processor; and
    at least one memory including computer program code for one or more programs,
    the at least one memory and the computer program code configured to, with the at least one processor, cause the apparatus to perform at least the following,
        retrieve the plurality of images, wherein the plurality of images is captured by a sensor of a vehicle during a drive;
        determine a vehicle trajectory of the vehicle during the drive;
        select a first image and a second image from the plurality of images, wherein the first image is captured later in time than the second image;
        re-arranging the first image and second image in reverse time order based on respective image capture times determined using the vehicle trajectory so that the feature as depicted in the first image has a larger image size relative to the feature as depicted in the second image based on the re-arrangement;
        after detecting the feature with the larger image size in the first image, process the second image to detect the feature and to associate the feature as detected in the second image with the feature previously detected in the first image; and
        processing the detected feature in the first image and the second image to triangulate the location of the feature.

11. The apparatus of claim 10, wherein the location of the feature is triangulated based on sensor pose data for the first image and the second image, and respective image locations of the detected feature in the first image frame and the second image frame.

12. The apparatus of claim 11, wherein the processing of the detected feature in the first image and the second image comprises calculating a parallax value, and wherein the feature is further triangulated based on the parallax value.

13. The apparatus of claim 10, wherein a first image position of the feature in the first image is closer to an image edge than a second image position of the feature in the second image.

14. A non-transitory computer-readable storage medium for determining a feature correspondence between image views, carrying one or more sequences of one or more instructions which, when executed by one or more processors, cause an apparatus to perform:
retrieving the plurality of images, wherein the plurality of images is captured by a sensor of a vehicle during a drive;
determining a vehicle trajectory of the vehicle during the drive;
selecting a first image and a second image from the plurality of images, wherein the first image is captured later in time than the second image;
re arranging the first image and second image in reverse time order based on respective image capture times determined using the vehicle trajectory so that the feature as depicted in the first image has a larger image size relative to the feature as depicted in the second image based on the re-arrangement;
after detecting the feature with the larger image size in the first image, processing the second image to detect the feature and to associate the feature as detected in the second image with the feature previously detected in the first image; and
processing the detected feature in the first image and the second image to triangulate the location of the feature.

15. The non-transitory computer-readable storage medium of claim 14, wherein the location of the feature is triangulated based on sensor pose data for the first image and the second image, and respective image locations of the detected feature in the first image frame and the second image frame.

16. The non-transitory computer-readable storage medium of claim 15, wherein the processing of the detected feature in the first image and the second image comprises calculating a parallax value, and wherein the feature is further triangulated based on the parallax value.

17. The non-transitory computer-readable storage medium of claim 14, wherein a first image position of the feature in the first image is closer to an image edge than a second image position of the feature in the second image.

* * * * *